United States Patent [19]

Fischbach

[11] 3,990,803

[45] Nov. 9, 1976

[54] FIXING SLEEVES OR BUSHINGS

[76] Inventor: Paul Fischbach, Bohmerwiese 9, D-58 Hagen, Germany

[22] Filed: May 5, 1975

[21] Appl. No.: 574,259

[30] Foreign Application Priority Data

May 4, 1974  Germany............................ 2421685

[52] U.S. Cl. .................................. 403/297; 85/8.3
[51] Int. Cl.² ............................................ F16B 13/00
[58] Field of Search .............. 403/292, 297; 85/8.3; 52/753 E

[56] References Cited
UNITED STATES PATENTS

| | | | |
|---|---|---|---|
| 2,972,275 | 2/1961 | Baubles.................................. | 85/8.3 |
| 3,227,030 | 1/1966 | Preziosi et al. ..................... | 85/8.3 X |
| 3,352,191 | 11/1967 | Crawford......................... | 403/292 X |
| 3,514,135 | 5/1970 | Cooper........................... | 403/297 X |

FOREIGN PATENTS OR APPLICATIONS 1,452,293  8/1966  France................................. 85/8.3

*Primary Examiner*—Andrew V. Kundrat

[57] ABSTRACT

A fixing sleeve or bushing formed from a strip of resilient material which is rolled to form a longitudinal tube-like member, at least one of the longitudinal edges being rolled over and bent inwardly whereby the longitudinal edges abut and form a resilient contact joint so that when said sleeve or bushing is inserted in a bore the longitudinal edges of the sleeve provide a rolling contact when the diameter of the sleeve is reduced and provide a substantially uniform radial pressure against the bore.

5 Claims, 6 Drawing Figures

FIXING SLEEVES OR BUSHINGS

The invention relates to cylindrical fixing sleeves or bushings, manufactured by rolling strips of springy material into a cylindrical shape. Such are used for making rigid or flexible connections between parts by driving them into respective coaxially positioned bores in said parts.

Existing fastening elements of this type, which are usually termed "fastening pins" and standardized in the German Federal Republic as set forth in DIN 1481/1498/7346 have as a distinguishing feature a slit extending therealong which produces the spring effect and are used instead of solid cylindrical and taper pins.

In addition to these known fixing sleeves having longitudinal slits, fastening pins serving the same purpose are known which consist of a plurality of turns of spirally wound strip (for example German Specifications Nos. 652755 and 975504).

In the case of the fixing sleeves of the firstmentioned kind, for example according to DIN 1481 and German Specification No. 416839, the spring effect is produced by a type of hinge, the hinged region of which is located opposite the slit. As a result of this and also because when inserted into a bore the slit does not close up, the fixing sleeve which is held in position after being driven into the bore by friction, almost invariably does not come into uniformly intimate contact with the entire wall surface of the bore. Such contact frequently only occurs as point contact in the regions of the slit and the opposite side. This is regarded as disadvantageous, because in many cases such partially effective contact is insufficient, and can lead to axial creeping and twisting in the housing bore which must be avoided by the use of additional securing means. This is particularly the case with short sleeves or bushings.

With movable fastenings, i.e. in cases in which the fixing sleeves and bushings are used as hinge pins, axles, shafts and the like, the edges of the slit must also be specially machined, in order to prevent it seizing up and scraping in the bore or bores which are movable relatively to the fixed portion. Moreover, it is frequently necessary to be very careful about the position of the slit when driving in the sleeve or bushing.

Moreover, in the course of present-day automated techniques pin connections generally and fixing sleeves also are machined and otherwise processed automatically and also stored in magazines. In this connection the open slit produces a tendency for the sleeves to become entangled and inter-locked with one another, which can only be avoided by anti-entanglement devices or by using special shapes of slit, such as toothed slits, corrugated or sawtooth slits. This drawback becomes particularly evident but not exclusively so in the small diameter range, since in this range the width of the slit is greater than the wall thickness of the sleeve, so that the sleeves can very easily telescope interlocked with one another.

These drawbacks admittedly do not apply to fixing pins in the shape of spirally wound strips according to German Specification No. 975504, but owing to their rigidity these pins can only deal with a small range of tolerances of a bore. Moreover, owing to their overlapping winding, spiral pins suffer from the drawback already mentioned in connection with fixing sleeves provided with slits, that they do not come into intimate bearing contact over a considerable part of the housing bore.

The drawbacks of unsuitability for magazine storage and for automatic machining and further processing should be avoided by the fastening pin described in German Specification as open to inspection No. 1500781 (equivalent to British Specification No. 1,164,060), but this pin is not easy to manufacture. To this end, in fact, a strip of springy material is first folded through 180° and the two-layer strip so formed is rolled in such fashion that the spacing between the folded longitudinal edge and the opposite longitudinal edge of one layer forms a slit, whilst the projection of the other layer beyond this edge produces a slit covering. However, there is a degree of overlapping on the slit side of this fastening pin, which leads to the already-mentioned disadvantage of non-uniform contact of the surface within the bore receiving the fixing sleeve.

The object of the invention is to provide a cylindrical fixing sleeve or bushing rolled out of springy material, which even in the unstressed state before insertion in the working position has a closed annular cross-section facilitating automatic machining and processing and magazine storage and which in addition to its also produces a pressure which is uniformly exerted in all radial directions against the housing bore by means of mutually resilient abutting edge joints.

According to the invention therefore there is provided a fixing sleeve or bushing for providing a rigid or flexible connection between two members when driven into coaxial bores provided therein, said sleeve or bushing being formed from a rolled-up length of springy strip material, characterized in that the longitudinal edges of the strip are in mutual contact to form a joint therebetween and at least one of the longitudinal edges is adapted to slide over the other edge in idling contact towards the axis of the sleeve or bushing when said sleeve or bushing is driven home into respective bores of the two members, and its diameter is reduced to a predetermined value.

In the case of the fixing sleeve or bushing according to the invention the outer edges of the strip which is bent round to form a tubular structure are in mutually abutting contact. By this means a closed annular cross-section is created and the slit present in conventional fixing sleeves or bushings thus becomes a contact joint. Any possibility of a collection of such sleeves being entangled or hooked together is thus avoided and they can thus be stored in a magazine or handled in other ways, for example magazine-fod without trouble.

The immediate juxtaposition of the edges of the strip which has been bent round to form a tube and consequently the complete absence of a slit would be expected to cause the disappearance of the action of the fixing sleeve due to the springy reduction of its diameter when driven home into its working position. Not only does this in fact not take place according to the invention, but the aforesaid action is in fact considerably enhanced by comparison with conventional fixing sleeves. This is due to the fact that the cross-section of at least one of the edges forming the joint is considerably smaller than that of the remainder of the sleeve body, for example it is bevelled and can be bent round inwardly towards its middle axis. Accordingly, as the diameter of the sleeve is reduced to its rated value when driven into the housing bore, the bent-over edge is rolled up against the opposite edge or when both edges are thus bent over, the process continues with the edges in mutual rolling contact. Thus the pressure generated by the mutual resilient abutment of the two edge joints acts in addition to the inherent resilience of the sleeve. The effect is to produce a pressure which is uniformly exerted in all radial directions against the housing bore, and which produces an interference fit depending on the degree of tapering of the edge or edges in relation to the thickness of the remainder of the sleeve body. By thus achieving an interference fit the wall thickness, and especially in the case of fixing bushings, can be reduced, thus achieving a considerable saving in material. Moreover, owing to the pressure uniformly exerted in all radial directions in the housing bore, the positioning of the joint provided instead of the conventional slit in the bore with respect to the direction of the loading force can be ignored.

Finally, an seizing or scraping of the sleeve when driven into the housing bore and during use in said bore is completely obviated by the rounded-off external surfaces resulting from the bending inward of the edges.

The invention will become clear from the following descriptive embodiments thereof taken with reference to the drawings wherein.

In contradistinction for example to fixing sleeves or bushings according to DIN 1481, those according to the invention do not include any actual definite side edges, but they do include edge regions or sections, different parts of which come into contact with one another in the pre-inserted condition and after insertion into the working site, depending on the degree of reduction of diameter caused by driving them into the housing bore. The term "edges" used herein for the purpose of simplification of definition is to be understood as including the aforesaid edge regions or sections. Moreover, everything that applies to fixing sleeves also applies to fixing bushings irrespective of the shape of the joint or joints, which may run axially or obliquely or may be of heringbone, sawtooth or corrugated shape.

Figure 1:
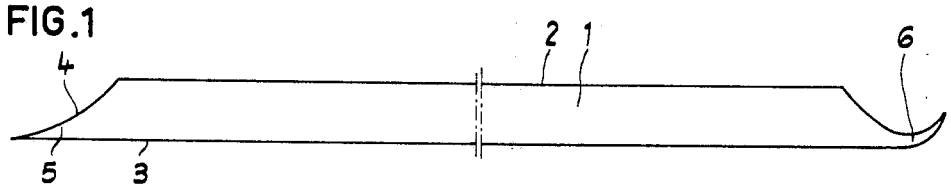
FIG. 1 is an end view of a strip of springy material as an intermediate product in the manufacture of a fixing sleeve or bushing according to the invention, two different steps in the preparation of said strip being also shown.

FIG. 1 shows an end view of a strip 1 made of springy material, the upper side 2 of which after the rolling operation to form a fixing sleeve will become the inside wall while the lower side 3 will be the outside wall of the sleeve. One outer end at least — and in the case of the preferred embodiment of FIGS. 1 to 3 both outer ends — has a tapering or bevelled region 5 preferably defined on the inside by a curved surface 4, which as is seen from the right-hand side of the diagram in FIG. 1 is bent inwardly and upwardly towards the upper side 2 to form a hook-shaped edge 6 before the strip 1 is rolled up.

Figure 2:
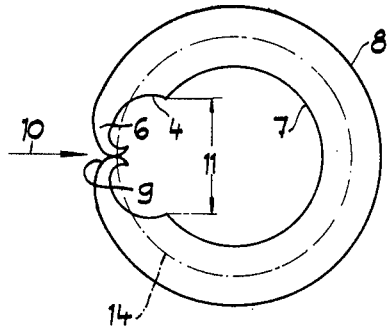
FIG. 2 is an end view of a preferred embodiment of a fixing sleeve or bushing produced according to the invention from a strip as shown in FIG. 1 and prior to insertion in its working position.

After the strip shown in FIG. 1 has been rolled up the fixing sleeve shown in end view in FIG. 2 is formed, in which the upper side 2 of the strip 1 becomes the interior surface and the lower side 3 becomes the load-supporting outer surface 8 of the sleeve. The procedure has been such that the two bent-over edges 6 come into contact along their outer curved surfaces 9 with the result that a joint 10 results between the mutually resilient abutting edges 6 instead of a slit.

Figure 3:
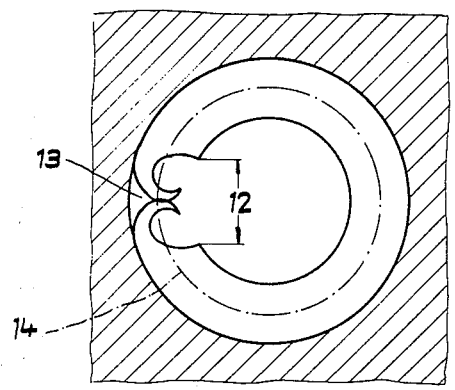
FIG. 3 is an end view of a fixing sleeve as shown in FIG. 2 disposed in its working position.

When the fixing sleeve is driven into its housing bore and its diameter is reduced to the rated value as shown in FIG. 3, the two curved sufaces 9 are mutually displaced in rolling contact. The distance 11 defined by the curved surfaces 4 before the sleeve is inserted into the bore (FIG. 2) is thus narrowed down to the distance 12 when in position in the bore (FIG. 3) and then increased spring tension produced by the aforesaid rolling contact gives rise to an additional pressure directed radially against the wall of the bore 13. During this operation the joint 10 remains as such and the inwardly curved surfaces 9 adjacent the joint prevent any scraping of friction in the bore 13. Moreover, the material stresses which are otherwise frequently set up during the interference fitting of a connecting pin, and particularly in the parts to be connected, are avoided owing to the resilience of the edges 6.

The reference 14 in FIGS. 2 and 3 denotes the center line of the sleeve cross-section. On comparing FIGS. 2 and 3 it will be seen that the theoretical line of contact or the actual contact surface between curved surface 9 is situated in both cases approximately in the region of this sectional middle line, but that before the sleeve is inserted in its working position this line of contact lies nearer the periphery, whereas when it is in position in the bore it has been displaced inwardly across the circular line 14 towards the axis of the sleeve.

Figure 4:
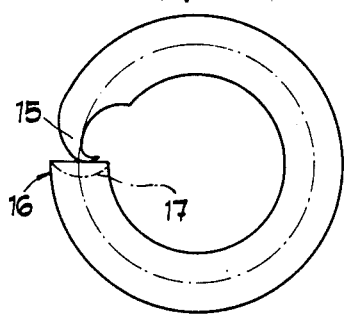
FIG. 4 is an end view corresponding to that of FIG. 2 of a modified embodiment of a fixing sleeve or bushing according to the invention.

FIG. 4 shows a simplified embodiment. In this embodiment only one edge 15 has the hook-shaped section 6 shown in the embodiment according to FIGS. 1 to 3, whilst the opposite edge 16 is not tapered in the manner previously described. It may, as is shown in FIG. 4, be a straight edge or may be rounded off (convex) or, as is shown for example in broken lines at 17, be concave.

Figure 6:
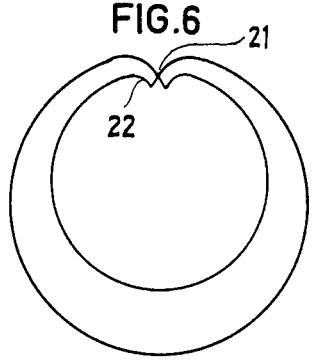
FIG. 6 is an end view corresponding to those of FIGS. 2 and 4 of a fixing sleeve or bushing made from a strip as shown in FIG. 5.
Figure 5:
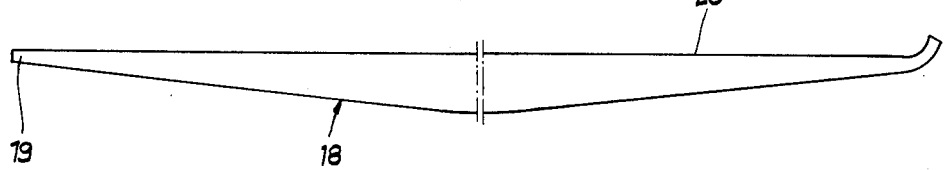
FIG. 5 is an end view corresponding to that of FIG. 1 of a further modified embodiment of a strip for the production of a fixing sleeve or bushing.

In the case of the embodiment shown in the examples of embodiment according to FIGS. 5 and 6 are based on the principle of the invention, the originating material is a strip indicated generally at 18 gradually tapering outwardly from the middle. If its ends 19 prior to the rolling up operation to form a fixing sleeve or bushing are bent inwards towards the upper side 20 of the strip as is shown on the right-hand side of FIG. 1, the fixing sleeve shown in end, view in FIG. 6 results, which has hook-shaped longitudinal edges 22, in mutually resilient abutting contact and forming a joint 21. When the sleeve is driven into a housing bore with the resultant reduction of its diameter to the rated diameter, these edges are displaced in rolling contact as in the case of the other embodiments described and illustrated. With this embodiment the spring action produced by the rolling contact between the hook-shaped longitudinal edges 22 is superimposed on the known resilient action of the sleeve and therefore achieves uniformly radially distributed pressure against the walls of the bore by the tapering cross section of the strip towards the joint as described above.

What I claim is:

1. A fixing sleeve or bushing for providing a rigid or flexible connection between two members when driven into coaxial bores provided therein, said sleeve or bushing being formed from a rolledup strip of resilient material into a cylinder in which the longitudinal edges of the strip are in mutual resilient contact and at least one of said longitudinal edges is curved back upon itself for rolling tangential contact against the other edge adjacent the center line of the sleeve cross-section whereby when the sleeve or bushing is inserted in the respective bores of the two members, the at least one longitudinal edge moves in rolling contact over the other edge towards the axis of the sleeve or bushing, the diameter of which is correspondingly reduced.

2. A fixing sleeve or bushing is claimed in claim 1 wherein the transverse cross section of the sleeve or bushing is tapered downwardly circumferentially from the region opposite the contacting edges.

3. A fixing sleeve or bushing as claimed in claim 1 wherein at least one of the two longitudinal edges of the strip is bevelled and bent over inwardly of the sleeve or bushing and is in resilient abutting contact against the opposite longitudinal edge, thus giving the sleeve or bushing a closed annular shape in cross section.

4. A fixing sleeve or bushing as claimed in claim 3 wherein only one longitudinal edge is longitudinally bevelled and bent over inwardly and the opposed longitudinal edge has a curved radial surface.

5. A fixing sleeve or bushing as claimed in claim 3 wherein both longitudinal edges of the sleeve or bushing are bevelled and bent over inwardly of the sleeve and are in mutual resilient abutting contact.

* * * * *